United States Patent
Kaynak et al.

(10) Patent No.: US 8,290,102 B2
(45) Date of Patent: Oct. 16, 2012

(54) ADAPTIVE DATA DEPENDENT NOISE PREDICTION (ADDNP)

(75) Inventors: Mustafa Kaynak, San Diego, CA (US); Sivagnanam Parthasarathy, Carlsbad, CA (US); Stefano Valle, Milan (IT); Shayan S. Garani, San Diego, CA (US)

(73) Assignees: STMicroelectronics, Inc., Carrollton, TX (US); STMicroelectronics SRL, Milan (IT)

( * ) Notice: Subject to any disclaimer, the term of this patent is extended or adjusted under 35 U.S.C. 154(b) by 339 days.

(21) Appl. No.: 12/687,797

(22) Filed: Jan. 14, 2010

(65) Prior Publication Data
US 2011/0085628 A1    Apr. 14, 2011

(30) Foreign Application Priority Data
Oct. 13, 2009 (IT) .............................. MI2009A1755

(51) Int. Cl.
*H04B 1/10* (2006.01)

(52) U.S. Cl. ........ 375/350; 375/224; 375/316; 375/340; 375/346; 455/63.1; 455/67.13; 455/114.2; 455/296; 455/501; 370/335; 370/342; 327/551

(58) Field of Classification Search ................ 375/224, 375/316, 340, 346, 350; 455/63.1, 67.13, 455/114.2, 296, 501; 370/335, 342; 327/551
See application file for complete search history.

(56) References Cited

U.S. PATENT DOCUMENTS

| 6,889,154 B2 * | 5/2005 | Ashley et al. ................ 702/107 |
| 2005/0249273 A1 | 11/2005 | Ashley et al. |
| 2008/0219392 A1 * | 9/2008 | Riani et al. .................... 375/371 |

FOREIGN PATENT DOCUMENTS

| WO | WO03/088240 A2 | 10/2003 |
| WO | WO2007/007244 A1 | 1/2007 |
| WO | WO2009/082542 A1 | 7/2009 |

OTHER PUBLICATIONS

Italian Search Report dated Mar. 29, 2010 in connection with Italian Patent Application No. MI2009A001755.

* cited by examiner

*Primary Examiner* — Leon Flores

(57) ABSTRACT

A method is provided. The method comprises calibrating noise prediction parameters by adapting one or more biases, adapting one or more filter coefficients using the adapted one or more biases, and adapting one or more prediction error variances using the adapted one or more biases and the adapted one or more filter coefficients.

20 Claims, 8 Drawing Sheets

| GROUP | C0: COND | C1: DEG(COND) | C2: PS(COND) | C3: DEG(PS(COND)) |
|---|---|---|---|---|
| 0 | 0000 | 1000 | 1111 | 0111 |
| 1 | 0001 | 1001 | 1110 | 0110 |
| 2 | 0010 | 1010 | 1101 | 0101 |
| 3 | 0011 | 1011 | 1100 | 0100 |

| | CONDITION | | | | | | | |
|---|---|---|---|---|---|---|---|---|
| | 00000 | 00001 | 00010 | 00011 | 00100 | 00101 | 00110 | 00111 |
| Lag 0 | $b^0_8(0000)$ | $b^0_8(0001)$ | $b^0_8(0010)$ | $b^0_8(0011)$ | $b^0_8(0100)$ | $b^0_8(0101)$ | $b^0_8(0110)$ | $b^0_8(0111)$ |
| Lag 1 | $b^0_8(0000)$ | $b^0_8(0000)$ | $b^0_8(0001)$ | $b^0_8(0001)$ | $b^0_8(0010)$ | $b^0_8(0010)$ | $b^0_8(0011)$ | $b^0_8(0011)$ |
| Lag 2 | $b^1_8(0000)$ | $b^1_8(0000)$ | $b^1_8(0001)$ | $b^1_8(0001)$ | $b^1_8(0010)$ | $b^1_8(0010)$ | $b^1_8(0011)$ | $b^1_8(0011)$ |
| | 01000 | 01001 | 01010 | 01011 | 01100 | 01101 | 01110 | 01111 |
| Lag 0 | $b^0_8(1000)$ | $b^0_8(1001)$ | $b^0_8(1010)$ | $b^0_8(1011)$ | $b^0_8(1100)$ | $b^0_8(1101)$ | $b^0_8(1110)$ | $b^0_8(1111)$ |
| Lag 1 | $b^0_8(0100)$ | $b^0_8(0100)$ | $b^0_8(0101)$ | $b^0_8(0101)$ | $b^0_8(0110)$ | $b^0_8(0110)$ | $b^0_8(0111)$ | $b^0_8(0111)$ |
| Lag 2 | $b^1_8(0100)$ | $b^1_8(0100)$ | $b^1_8(0101)$ | $b^1_8(0101)$ | $b^1_8(0110)$ | $b^1_8(0110)$ | $b^1_8(0111)$ | $b^1_8(0111)$ |
| | 10000 | 10001 | 10010 | 10011 | 10100 | 10101 | 10110 | 10111 |
| Lag 0 | $b^0_8(0000)$ | $b^0_8(0001)$ | $b^0_8(0010)$ | $b^0_8(0011)$ | $b^0_8(0100)$ | $b^0_8(0101)$ | $b^0_8(0110)$ | $b^0_8(0111)$ |
| Lag 1 | $b^0_8(1000)$ | $b^0_8(1000)$ | $b^0_8(1001)$ | $b^0_8(1001)$ | $b^0_8(1010)$ | $b^0_8(1010)$ | $b^0_8(1011)$ | $b^0_8(1011)$ |
| Lag 2 | $b^1_8(1000)$ | $b^1_8(1000)$ | $b^1_8(1001)$ | $b^1_8(1001)$ | $b^1_8(1010)$ | $b^1_8(1010)$ | $b^1_8(1011)$ | $b^1_8(1011)$ |
| | 11000 | 11001 | 11010 | 11011 | 11100 | 11101 | 11110 | 11111 |
| Lag 0 | $b^0_8(1000)$ | $b^0_8(1001)$ | $b^0_8(1010)$ | $b^0_8(1011)$ | $b^0_8(1100)$ | $b^0_8(1101)$ | $b^0_8(1110)$ | $b^0_8(1111)$ |
| Lag 1 | $b^0_8(1100)$ | $b^0_8(1100)$ | $b^0_8(1101)$ | $b^0_8(1101)$ | $b^0_8(1110)$ | $b^0_8(1110)$ | $b^0_8(1111)$ | $b^0_8(1111)$ |
| Lag 2 | $b^1_8(1100)$ | $b^1_8(1100)$ | $b^1_8(1101)$ | $b^1_8(1101)$ | $b^1_8(1110)$ | $b^1_8(1110)$ | $b^1_8(1111)$ | $b^1_8(1111)$ |

FIG. 6

ADAPTIVE DATA DEPENDENT NOISE PREDICTION (ADDNP)

CROSS-REFERENCE TO RELATED APPLICATION(S) AND CLAIM OF PRIORITY

This application claims the benefit under 35 U.S.C. §119(a) to an Italian patent application filed in the Italian Patent and Trademark Office on Oct. 13, 2009 and assigned Serial No. MI2009A001755, the entire disclosure of which is hereby incorporated by reference.

TECHNICAL FIELD OF THE INVENTION

The present application relates generally to communications systems and, more specifically, to a system and method for adaptive noise prediction in communications systems.

BACKGROUND OF THE INVENTION

The performance of several communication systems suffers from correlated (and possibly data-dependent) noise in addition to inter-symbol interference (ISI). In general, a channel detector or equalizer is used to remove ISI. Having correlated noise is more advantageous than having white noise because noise correlation can be used to improve the performance of a channel detector.

SUMMARY OF THE INVENTION

A method is provided. The method comprises calibrating noise prediction parameters by adapting one or more biases, adapting one or more filter coefficients using the adapted one or more biases, and adapting one or more prediction error variances using the adapted one or more biases and the adapted one or more filter coefficients.

A system is provided. The system comprises a bias adaptation component operable to adapt one or more biases, a filter coefficients component operable to adapt one or more filter coefficients using the adapted one or more biases, and a prediction error variance component operable to adapt one or more prediction error variances using the adapted one or more biases and the adapted one or more filter coefficients.

A system is provided. The system comprises a detector and a computation component operable to receive noise prediction parameters. The noise prediction parameters comprising one or more adapted biases, one or more filter coefficients adapted using the adapted one or more biases, and one or more prediction error variances adapted using the adapted one or more biases and the adapted one or more filter coefficients. The computation component is further operable to convert the noise prediction parameters into a form that is directly usable by the detector.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a table used to determine which 8 state biases are to be used in place of a 16 state bias according to an embodiment of this disclosure;

DETAILED DESCRIPTION OF THE INVENTION

Figure 1:
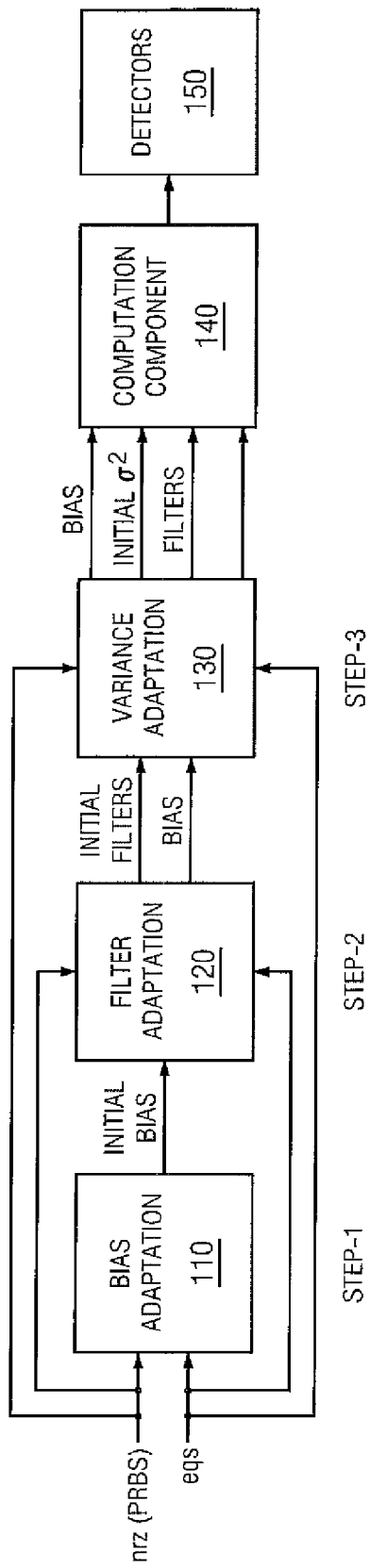
FIG. 1 illustrates an initial adaptation stage of an adaptive DDNP calibration system according to an embodiment of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

This disclosure describes a system and method for adaptive data-dependent noise prediction (ADDNP).

In an embodiment, a maximum-a-posteriori (MAP) detector or a soft output Viterbi algorithm (SOVA) detector is used to remove ISI. Both detectors compute soft information (i.e., likelihood information) that might be used by an outer error correction code. To take advantage of noise correlation, noise predictive channel detection (e.g., by a noise-predictive maximum-likelihood (NPML) detector) and data-dependent noise prediction (DDNP) are incorporated into MAP and SOVA detectors.

For correlated, data-dependent noise, a certain number of neighboring noise samples (both past and future) contributes to a noise sample. By performing noise prediction, the contributions of these neighboring noise samples are removed and noise power is reduced. If the noise prediction was performed perfectly (which is not practically possible), only the white portion of the noise sample would remain. As a result, detectors employing DDNP lead to significant performance improvements compared to traditional non-noise predictive channel detectors.

For magnetic recording systems, noise is data dependent due to media noise which is the result of random shifts in the position and width of the transition response. The more transitions there are in a transition sequence, the more likely a shift in the transition response is observed. Noise also is data dependent due to mis-equalization that occurs when the channel (which has very long ISI span) is equalized to a shorter pre-determined target. Because a finite length, finite-impulse-response (FIR) linear equalizer is used for this partial response equalization, ISI cannot be completely removed. As a result, residual IST remains. Noise also is correlated (or colored) due to the presence of the partial response equalizer. Because media noise is the dominant noise source for high density perpendicular recording systems, this disclosure describes a system and method for utilizing DDNP detectors (DDNP-MAP or DDNP-SOVA) in communication systems, such as high density perpendicular recording systems.

In order to take full advantage of the correlated, data-dependent noise at the channel detector, the following DDNP parameters for each data pattern (condition) are properly calibrated:
 1. biases or sample means,
 2. prediction filters, and
 3. prediction error variance.

These parameters can be calibrated, for example, using the well-known Wiener solution by collecting the noise statistics for each condition. Optimal results are obtained when the noise process is stationary.

However, because the channel conditions for disk drives change over time, DDNP parameters optimized for a given initial channel condition will not deliver optimum performance under different channel conditions over time. Therefore, adaptation of the DDNP parameters to changing channel conditions is essential for good performance.

Furthermore, the Wiener solution for the DDNP coefficients require matrix inversion, and becomes computationally expensive in hardware if 3 or more tap DDNP filters (inversion of a 3×3 or larger matrix) are used.

This disclosure provides an adaptive DDNP calibration method and system that delivers robust DDNP parameters under changing channel conditions without computationally expensive operations such as matrix inversion. The disclosed adaptive DDNP calibration system is hardware efficient and delivers the performance of an optimal Wiener solution if channel conditions remain the same. The disclosed system is applicable to any communication system suffering from correlated, data-dependent noise.

FIG. 1 illustrates an initial adaptation stage of an adaptive DDNP calibration system 100 according to an embodiment of this disclosure.

As shown in FIG. 1, the initial adaptation stage of system 100 involves the adaptation of initial biases, initial DDNP filters, and initial variances sequentially.

Input data is received at a bias adaptation component 110. In a particular embodiment, the input data to bias adaptation component 110 includes equalized samples and Nonreturn to Zero (NRZ) bits. For NRZ bits, either known pseudo random bit sequence (PRBS) data or unknown data can be used. In some embodiments, unknown data (or hard decisions of the channel detector) can be used provided that the bit error rate of the hard decisions is less than 2E-2, and the equalized samples are qualified for use based on their log-likelihood ratios (i.e., reliabilities computed by the channel detector). In some embodiments, when the predicted data (i.e., unknown data) is used for an ADDNP calibration system, the DDNP is initially a pass through (i.e., the prediction filter is [1 0 . . . 0], variance=1, and biases are the ideal values computed from the known partial response target for all conditions).

In a particular embodiment, initial biases are adapted by averaging samples using the optimum gain profile. For condition i and lag j, the bias term at adaptation step (k+1) is computed as shown below in Equations 1 and 2:

$$bias_j^i(k+1) = bias_j^i(k) + \gamma_k \cdot (eqs_{k-j} - bias_j^i(k)),  \quad [\text{Eqn. 1}]$$

and $$\gamma_k = \frac{1}{k} \approx 2^{-round(log2(k))}, \quad [\text{Eqn. 2}]$$

where k=1, . . . , BIAS_HIT_MAX and eqs corresponds to the equalized samples for the condition under consideration. The bias term for step k=0 is zero, and initial adaptation is continued until k=BIAS_HIT_MAX hits per condition are collected. An advantage of this approach is that it can provide the intermediate bias values at any time. This is in distinct contrast to using an accumulator where the initial bias value will be available only after a certain number of hits per condition is reached with the number being is selected to be a power of 2. After enough hits are collected, the optimal gain profile becomes constant, and for each additional sample to be used for the averaging, the optimum gain profile becomes 1/BIAS_HIT_MAX for k≧BIAS_HIT_MAX.

Figure 2:
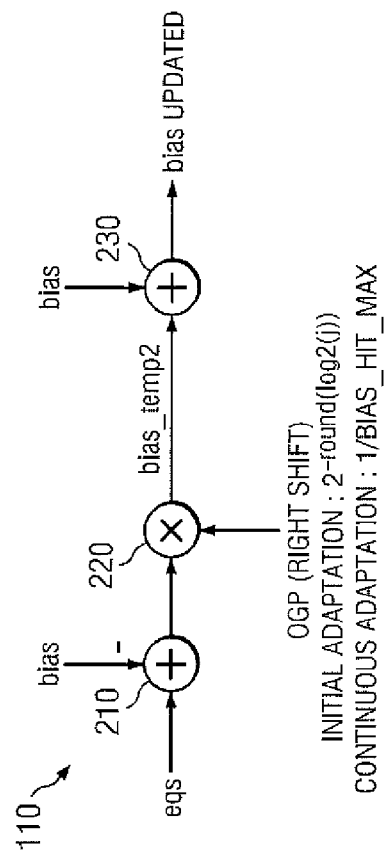
FIG. 2 illustrates a diagram of bias adaptation occurring in a bias adaptation component according to an embodiment of this disclosure.

FIG. 2 illustrates a diagram of bias adaptation occurring in bias adaptation component 110 according to an embodiment of this disclosure.

As shown in FIG. 2, a bias term from the previous adaptation stage is removed from an equalized sample at an adder 210. The output of adder 210 is received at a mixer 220. Mixer 220 performs a right shift operation on the output of adder 210. As described earlier, the optimum gain profile is initially $2^{-round(log\ 2(k))}$ and becomes 1/BIAS_HIT_MAX for k≧BIAS_HIT_MAX. The output of mixer 220 is then recombined with the bias at an adder 230 which produces an updated bias term.

Returning to FIG. 1, once the initial bias terms are adapted at bias adaptation component 110, the adapted initial bias terms are used at a filter coefficient adaptation component 120 to adapt the initial DDNP filter coefficients. The known NRZ data are used at this component as well as bias adaptation component 110, and all-zero DDNP filters are assumed. As disclosed earlier, the predicted data (i.e., unknown data) can be used for prediction filter adaption as well subject to qualification using the reliability information.

In a particular embodiment, the computation at filter coefficient adaptation component 120 is as follows:

1. Condition i from the known NRZ data is determined. For example, if the NRZ sequence is [101100101 . . . ] with the left-most bit as the first value, the following conditions are derived in order 1011, 0110, 1100, 1001, 0010, 0101. etc., assuming 4 bit conditions.

2. For condition i, the instantaneous noise terms ($n_{k-j}$) for all lags (j: lag index) are computed by subtracting biases of condition i from equalized samples as shown in Equation 3 below:

$$n_{k-j}^i = eqs_{k-j} - bias_j^i.  \quad [\text{Eqn. 3}]$$

3. The predicted noise sample is calculated as shown in Equation 4 below:

$$\text{pr\_nk}^i = \sum_{j=1}^{L} n_{k-j}^i \cdot a_j^i(k), \quad [\text{Eqn. 4}]$$

where L is the length of the DDNP filters.

4. The prediction error is computed as shown in Equation 5 below:

$$\text{pr\_err} = n_k^i - \text{pr\_nk}^i. \quad [\text{Eqn. 5}]$$

5. The prediction filters at the least-mean-square (LMS) step (k+1) are updated using the prediction error as shown in Equation 6 below:

$$a_j^i(k+1) = a_j^i(k) + \mu \cdot \text{pr\_err} \cdot n_{k-j}^i, \quad [\text{Eqn. 6}]$$

where $a_j^i(0)=0$ for a given condition i, and $\mu$ is the learning or adaptation rate. The DDNP filters are adapted until a predetermined number of hits FIR_HIT_MAX per condition is reached.

During the initial filter adaptation, the biases are being continuously adapted as well.

For the case of polarity symmetry, conditions having a transition or no transition at the same location (conditions 0000 and 1111 or 1001 and 0110) are considered to be equivalent. As a result, the number of filters is reduced to half.

The learning or adaptation rate plays an important role in the convergence speed of filter adaptation. While faster (larger) adaptation rates lead to faster convergence or response, faster adaptation rates are limited when it comes to fine tuning the filter coefficients. Conversely, while slower (smaller) adaptation rates are better for fine tuning the filter coefficients, the slower adaptation rates require more data to do the initial filter adaptation. Accordingly, in order to have faster convergence and better fine tuning, variable/programmable adaptation rates at different stages of adaptation may be utilized according in an embodiment of this disclosure.

A relatively faster (larger) adaptation rate is utilized at the beginning of the initial filter adaptation. After FIR_HIT_MAX/2 hits (or some other hit number less than FIR_HIT_MAX hits) are collected for all conditions, a slower (smaller) adaptation rate is utilized until the end of the initial filter adaptation. Once the initial filter adaptation is finished, the adaptation rate is decreased even further, and this smallest adaptation rate is utilized during the initial filter adaptation and also during continuous adaptation.

Figure 3:
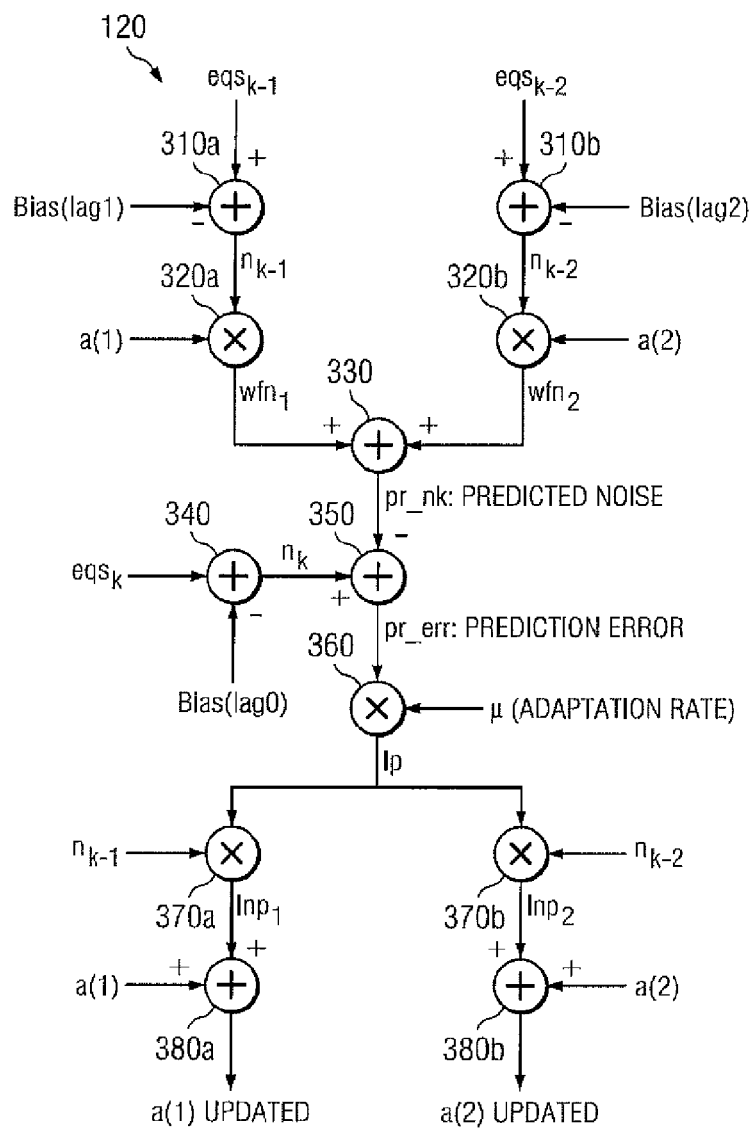
FIG. 3 illustrates a diagram of filter coefficient adaptation occurring in a filter coefficient adaptation component according to an embodiment of this disclosure.

FIG. 3 illustrates a diagram of filter coefficient adaptation occurring in filter coefficient adaptation component 120 according to an embodiment of this disclosure.

As shown in FIG. 3, the instantaneous noise terms ($n_{k-j}$) for all lags (j: lag index) are computed by subtracting biases of condition i from equalized samples at adders 310a and 310b. Mixers 320a and 320b receive a first and a second filter coefficient, respectively, in addition to the noise terms from adders 310a and 310b, respectively, and perform a mixing operation. An adder 330 receives the output from mixers 320a and 320b and performs an adding operation to generate a predicted noise signal.

Also shown in FIG. 3 is an adder 340 that performs an adding operation to remove a bias from an equalized sample to generate a noise term. The noise term from adder 340 and the predicted noise signal from adder 330 are received at an adder 350. Adder 350 performs an adding operation to remove the predicted noise signal from adder 330 from the predicted noise signal from adder 330 to generate a prediction error. A mixer 360 receives the prediction error as well as the adaptation rate and performs a mixing operation. The result of this mixing operation is received at mixers 370a and 370b. Mixers 370a and 370b also receive the noise terms generated by adders 310a and 310b, respectively, and perform a mixing operation. The result of the mixing operation of mixers 370a and 370b are received at adders 380a and 380b, respectively. Adders 380a and 380b also receive the first and second filter coefficients, respectively, and perform an adding operation to generate an updated first and second filter coefficient.

Although the embodiment of FIG. 3 is shown as having 2-tap filter, one of ordinary skill in the art would recognize that any number of taps can be used without from the scope or spirit of this disclosure.

Returning again to FIG. 1, after adapting the initial biases and DDNP filters, the adapted initial biases and the adapted initial filter coefficients are used at an initial prediction error variance adaptation component 130. The initial prediction error variance is adapted at this component by averaging the square of the prediction errors using the optimum gain profile. This is similar to the description of the initial bias adaptation. In one particular embodiment, the prediction error is determined using Equations 3-5, and the variance for condition i at step (k+1) is adapted as shown in Equations 7 and 8:

$$\sigma_i^2(k+1) = \sigma_i^2(k) + \gamma_k \cdot (\text{pr\_err}^2 - \sigma_i^2(k)), \quad [\text{Eqn. 7}]$$

and $$\gamma_k = \frac{1}{k} \approx 2^{-\text{round}(\log 2(k))}. \quad [\text{Eqn. 8}]$$

Initial variance terms at LMS step 0 are zeros, and this adaptation continues until k=VAR_HIT_MAX. After enough hits for all conditions are collected, the optimal gain profile becomes constant, and for each additional sample to be used for the averaging, an optimal gain profile of 1/VAR_HIT_MAX is used.

Figure 4:
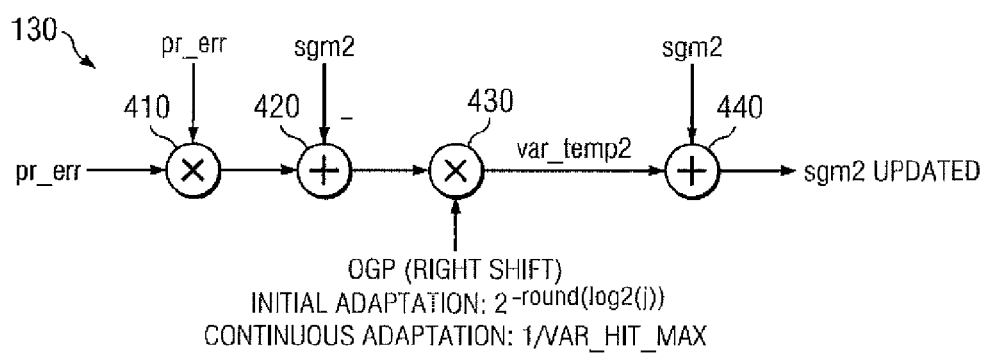
FIG. 4 illustrates a diagram of prediction error variance adaptation occurring in a prediction error variance adaptation component according to an embodiment of this disclosure.

FIG. 4 illustrates a diagram of prediction error variance adaptation occurring in initial prediction error variance adaptation component 130 according to an embodiment of this disclosure.

As shown in FIG. 4, prediction errors are received at a mixer 410. Mixer 410 performs a mixing operation. An adder 420 receives the output from mixer 410 and subtracts a variance value from the output of mixer 410. A mixer 430 then performs a right shift operation on the output of adder 420. An adder 440 receives the variance value as well as the output of mixer 430, and performs an adding operation to generate an updated variance value.

During the initial variance adaptation, the biases and the DDNP filters are being continuously adapted.

The polarity symmetry assumed for the prediction filters apply to the variance as well. Accordingly, the number of variances is reduced by half as well.

In some embodiments, the initial adaptation of the DDNP parameters is done sequentially (i.e., first the biases, then the filters and finally the variances are adapted). This sequential adaptation results in more reliable parameters because filter adaptation requires reliable biases. Therefore, if initial biases are adapted during initial filter adaptation, the prediction filters will not be very reliable. Similarly, prediction error variance will be reliable if reliable biases and filters are used for its adaptation. Therefore, if initial biases and filters are adapted during initial variance adaptation, the resulting prediction error variances will not be very reliable. Therefore, sequential initial adaptation is important. Accordingly, initial bias adaptation is performed first. Once the initial biases are adapted, initial filter adaptation which relies on the initial biases is performed. After the initial filter adaptation is completed, initial variance adaptation is performed.

In an embodiment of this disclosure, the adaptation engine processes the samples of one condition at a given time. As soon as the adaptation engine finishes processing one condition, the adaptation engine starts the processing of the samples of the next condition present at that time. There is no constraint/restriction on the next condition to be processed by the adaptation engine, such as the next condition has to be the same as the previous condition. In other words, the adaptation engine processes the samples of conditions in the order that the samples are received. As a result, the disclosed system is not limited to finishing the initial adaptation of a chosen condition before starting the initial adaptation of the next condition which would clearly be very slow (i.e., require a lot of sectors) to complete the initial adaptation of the DDNP parameters.

The initial adaptation calibrates the initial DDNP parameters and can be considered as the initial factory calibration for hard disk drives.

Continuous adaptation on the other hand refers to the calibration of these parameters during the lifetime of the device. During continuous adaptation, the filters, biases and variance terms for each condition are continuously adapted, and for the case of magnetic recording systems, the DDNP parameters of the detector are updated using these newly updated parameters at the sector/fragment boundaries or when the detector is not busy.

The adapted DDNP parameters can be used by the detector directly. However, in order to reduce the complexity of the detector, the DDNP parameters are converted into a form that is directly usable by the detector. The component performing this conversion is shown as a post computation component 140 or cooker in FIG. 1. Detectors 150 are aligned with the output parameters of computation component 140. Therefore, detectors 150 start making use of the newly adapted DDNP parameters once the parameters are computed by computation component 140.

Figures 5, 7:
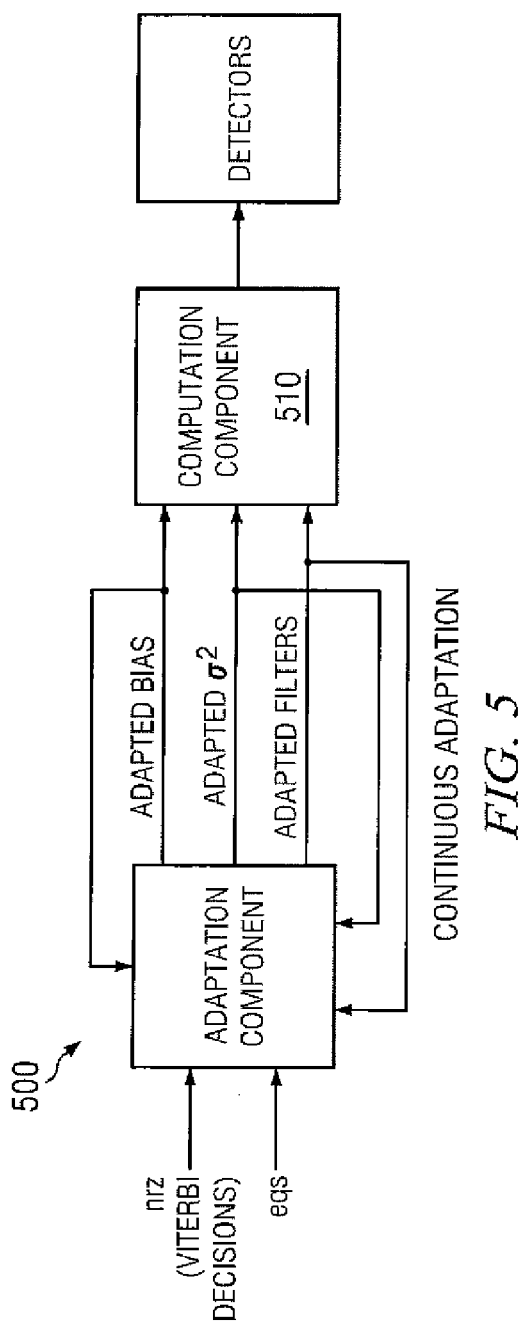
FIG. 5 illustrates a continuous adaptation stage of an adaptive DDNP calibration system according to an embodiment of this disclosure.
FIG. 7 illustrates a table of degenerated conditions for an 8 state detector for filter and variance adaptation according to an embodiment of this disclosure.

FIG. 5 illustrates a continuous adaptation stage of an adaptive DDNP calibration system 500 according to an embodiment of this disclosure.

For continuous adaptation, the DDNP filters, biases and variance terms passed to a computation component 510 at the sector/fragment boundary are also the starting variables used for the adaptation for the next sector/fragment boundary. Therefore, those variables are shown as the inputs to the adaptation component.

The disclosed ADDNP system and method can approximate or degenerate higher state biases using lower state biases. The following describes how 8 state biases are used to approximate 16 state biases.

Assuming "$y_k$" denotes equalized samples and "edcba" ("a" most recent) denotes NRZ bits, 16 state biases conditioned to NRZ bits are given as follows:

$B^0_{16}(edcba) = E\{y_k|edcba\} = E\{y_k|b_{k-4} b_{k-3} b_{k-2} b_{k-1} b_k\}$; and
$B^1_{16}(edcba) = E\{y_{k-1}|edcba\}$ & $B^2_{16}(edcba) = E\{y_{k-2}|edcba\}$.

The 8 state biases denoted by "$b^8_c$" are as follows:

$b^0_8(dcba) = E\{y_k|dcba\} = E\{y_k|b_{k-3} b_{k-2} b_{k-1} b_k\}$ & $b^1_8(dcba) = E\{y_{k-1}|dcba\} = E\{y_{k-1}|b_{k-3} b_{k-2} b_{k-1} b_k\}$; and
$b^2_8(dcba) = E\{y_{k-2}|dcba\} = E\{y_{k-2}|b_{k-3} b_{k-2} b_{k-1} b_k\}$.

Using the 8 state biases, the 16 state biases can be degenerated as follows:

lag 0: $B^0_{16}(edcba) \sim b^0_8(dcba)$ & lag 0: $B^0_{16}(\underline{e}dcba) \sim b^0_8(dcba)$;

lag 1: $B^1_{16}(edcba) \sim b^0_8(edcb)$ & lag 1: $B^1_{16}(edcb\underline{a}) \sim b^0_8(edcb)$; and lag 2: $B^2_{16}(edcba) \sim b^1_8(edcb)$ & lag 2: $B^2_{16}(edcb\underline{a}) \sim b^1_8(edcb)$, where "underlying" represents binary negation operation i.e., "0=1" and "1=0".

FIG. 6 illustrates a table 600 used to determine which 8 state biases are to be used in place of a 16 state bias according to an embodiment of this disclosure.

Table 600 provides degenerated 16 state biases from 8 state biases. The advantage of bias degeneration is reduced complexity or area. If degeneration was not performed for a 16 state detector, 32×3 biases (assuming 3 tap DDNP) would need to be adapted. With degeneration, 16×3 biases would need to be adapted. Accordingly, degeneration saves both power and area.

The disclosed ADDNP system also supports prediction filter and variance degeneration/approximation.

Parameter degeneration allows the same DDNP parameters to be shared among conditions that have a different number of transitions. For example, condition c=[1010] has a polarity symmetry of c=[0101]. Both conditions have 3 transitions and share the same DDNP filters and the same variance. By degree-1 degeneration, conditions [0010] and [1101] share the same parameters with [1010] and [0101]. In some embodiments, the least significant bit $b_{k-4}$ for condition $c = [b_{k-3} b_{k-2} b_{k-1} b_k]$ is disregarded for degree-1 degeneration.

As such, in some embodiments, with degree-1 degeneration (in addition to polarity symmetry), the following conditions belong to the same group (underlying denotes polarity symmetry):

(0 $b_{k-2} b_{k-1} b_k$) (1 $b_{k-2} b_{k-1} b_k$), (0 $\underline{b_{k-2}b_{k-1}b_k}$), (1 $\underline{b_{k-2}b_{k-1}b_k}$).

FIG. 7 illustrates a table 700 of degenerated conditions for an 8 state detector according to an embodiment of this disclosure.

In the noise prediction system detailed above in Equation 4, the past L noise samples were used to whiten the current noise sample. This approach is used when the future samples/data do not influence the past data. However, magnetic recording systems have very long ISI spans that extend to both past and future. Therefore, the future data affects the past data as well. As a result, the current noise sample is correlated with both past and future noise samples. This unique property of magnetic recording systems can be taken advantage of to employ causal and anti-causal noise prediction.

Figure 8:
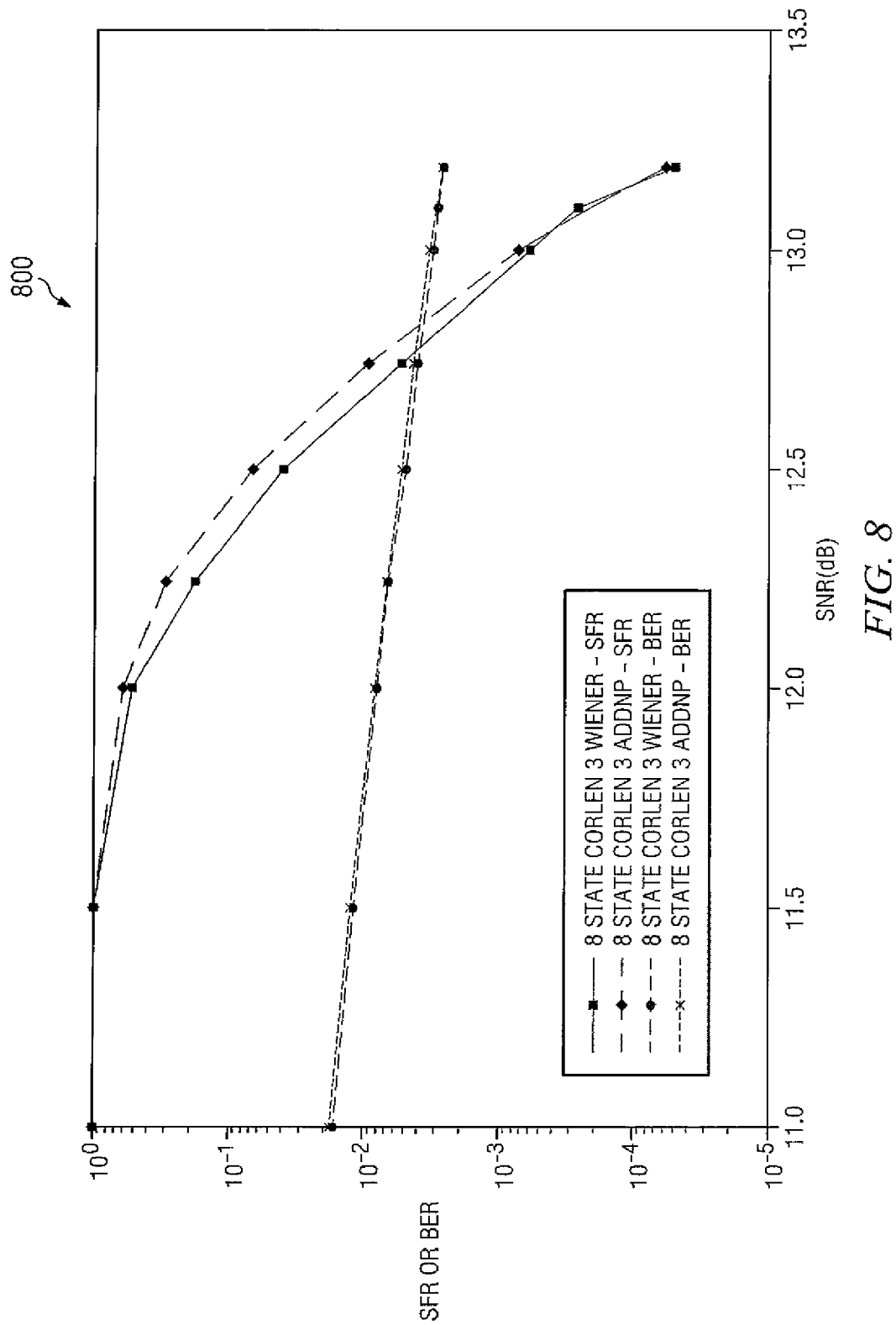
FIG. 8 is a graph comparing the SFR/BER performance of a system in accordance with an embodiment of this disclosure against a system employing the Wiener solution.

FIG. 8 is a graph 800 comparing the SFR/BER performance of a system in accordance with an embodiment of this disclosure against a system employing the Wiener solution.

Graph 800 compares the performance of the disclosed ADDNP calibration system and method against the Wiener solution over a high density perpendicular magnetic recording channel with high jitter noise. In this comparison, a 2 tap partial response target and a correlation length of 3 is assumed (i.e., 3 tap biases and 2 tap filters). The sector failure rate (SFR) assuming an error checking and correction (ECC) capability of 20 10 bit symbols and the bit error rate (BER) performance of the detector is shown in graph 800. As shown in graph 800, the disclosed ADDNP system and method performs very close to the optimal Wiener solution without being computationally expensive in hardware. Furthermore, the channel conditions did not change for this simulation, and the advantages of the disclosed detector become even more pronounced when the channel conditions change.

In one embodiment, the following conditions were present:
a perpendicular recording channel with UBD=2.10, 90% jitter);
a 16 state system having 16×3 biases degenerated using 8 state biases vs. actual 16 state labels (i.e., no bias degeneration); and
for filter and variance, polar symmetry was present but no degeneration (i.e., 16 1×2 prediction filters and 16 biases were used).

Figure 9:
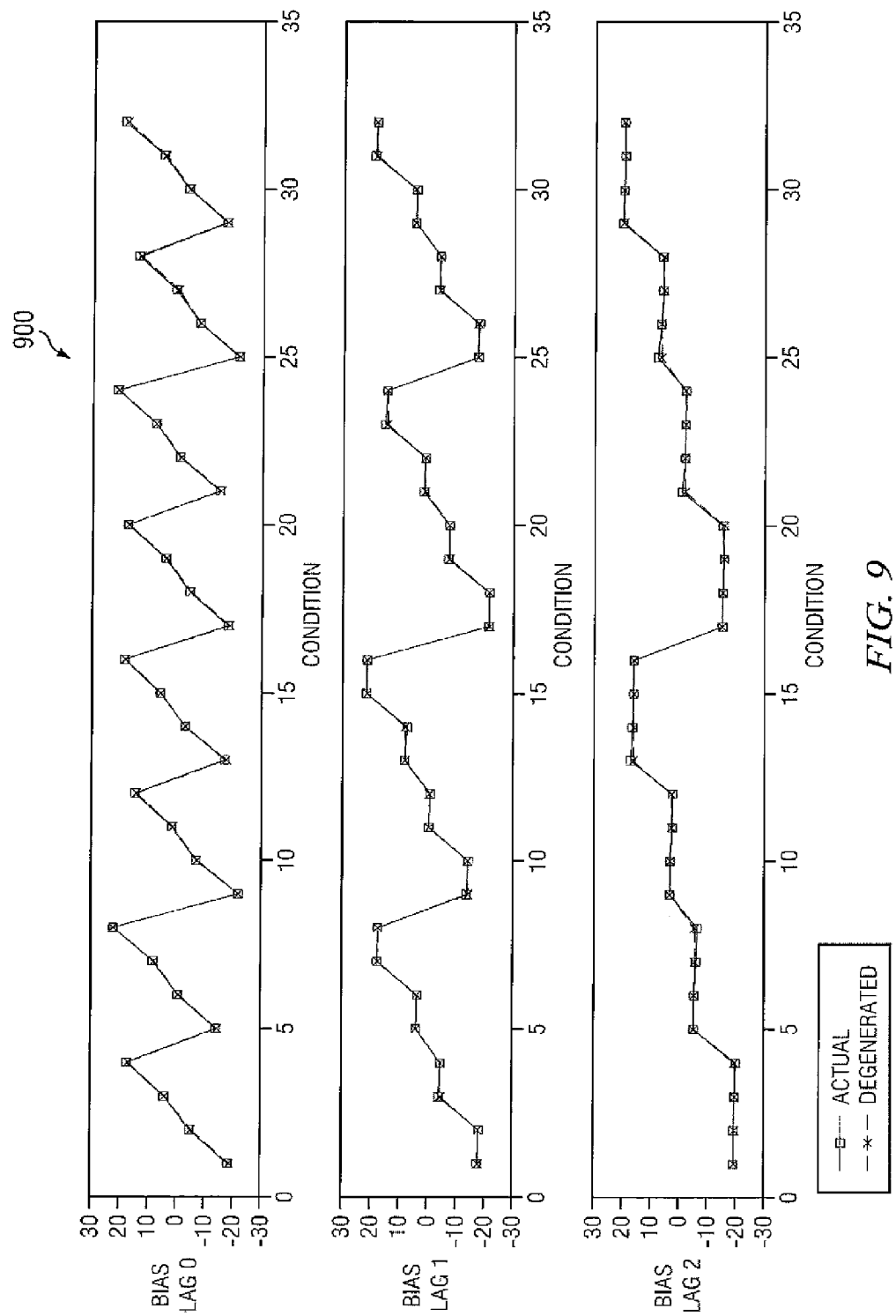
FIG. 9 is a chart comparing 16 state biases (3 lags) degenerated using 8 state biases against 16 actual state biases.

FIG. 9 is a chart 900 comparing 16 state biases degenerated using 8 state biases against 16 actual state biases.

Figure 10:
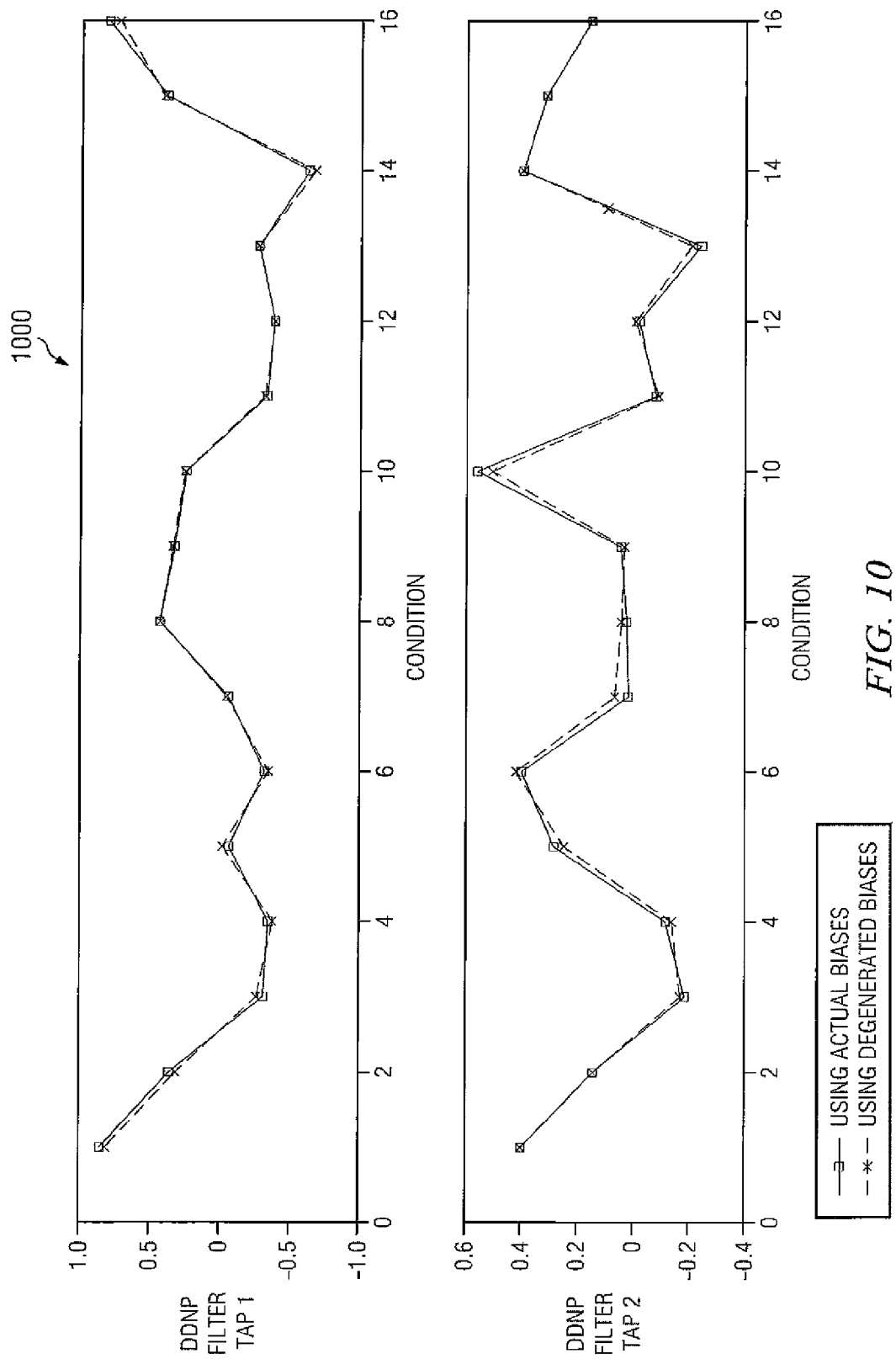
FIG. 10 is a chart comparing a prediction filter coefficients (2 taps) adapted using degenerated biases against a prediction filter coefficients adapted using 16 actual state biases.

FIG. 10 is a chart 1000 comparing prediction filters adapted using degenerated biases against prediction filters adapted using 16 actual state biases.

Figure 11:
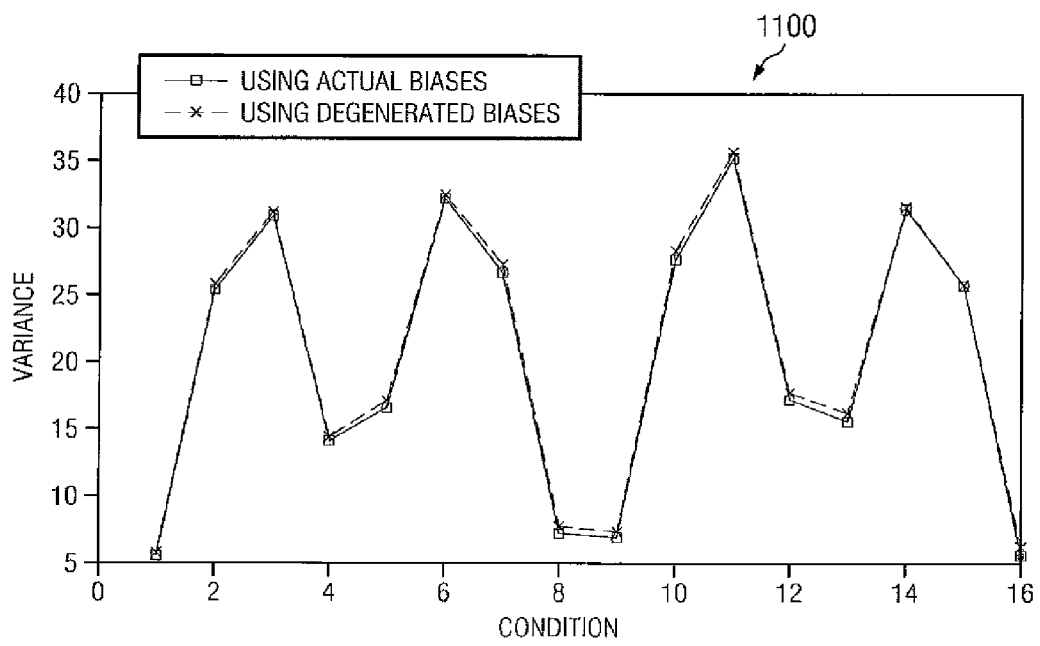
FIG. 11 is a chart comparing prediction error variances adapted using degenerated biases against prediction error variances adapted using 16 actual state biases.

FIG. 11 is a chart 1100 comparing variances adapted using degenerated biases against variances adapted using 16 actual state biases.

The results shown in FIGS. 9-11 illustrate that the filters and variances adapted using degenerated biases are very close to filters and variances adapted using actual 16 state biases.

Figure 12:
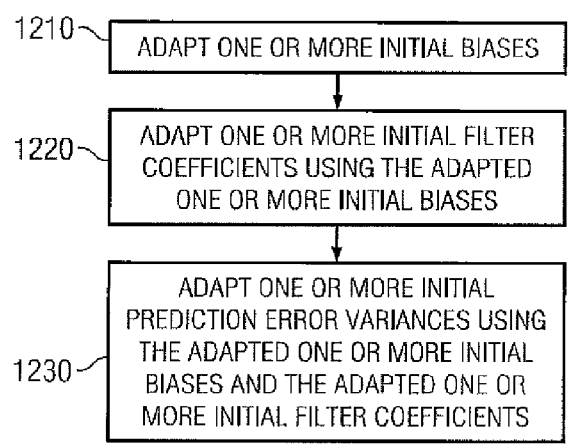
FIG. 12 illustrates a method for adaptive data-dependent noise prediction (ADDNP) according to an embodiment of this disclosure.

FIG. 12 illustrates a method 1200 method for adaptive data-dependent noise prediction (ADDNP) according to an embodiment of this disclosure.

As shown at block 1210, method 1200 comprises adapting initial biases by averaging samples using the optimum gain profile. Method 1200 also comprises adapting the initial DDNP filter coefficients using the adapted initial at block 1220 while continuously adapting the bias terms. At block 1230, method 1200 further comprises adapting an initial prediction error variance using the adapted initial biases and the adapted initial filter coefficients by averaging squares of prediction error variances using the optimum gain profile while continuously adapting the biases and the DDNP filters.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
calibrating noise prediction parameters by:
adapting one or more biases in a hardware receiver by averaging a plurality of samples using an optimum gain profile, wherein the optimum gain profile provides a running average of the adapted one or more biases,
adapting one or more filter coefficients in the hardware receiver using the adapted one or more biases, and
adapting one or more prediction error variances in the hardware receiver using the adapted one or more biases and the adapted one or more filter coefficients.

2. A method in accordance with claim 1, wherein the one or more biases are adapted in an adaptation stage of an adaptive data-dependent noise prediction (DDNP) calibration system.

3. A method in accordance with claim 1, wherein the one or more prediction error variances are adapted by averaging a plurality of a square of prediction errors using an optimum gain profile, and wherein the optimum gain profile provides a running average of the one or more adapted prediction error variances.

4. A method in accordance with claim 1, further comprising:
continuously adapting the one or more biases while adapting the one or more filter coefficients.

5. A method in accordance with claim 1, further comprising:
continuously adapting at least one of the one or more biases and the one or more filter coefficients while adapting the one or more prediction error variances.

6. A method in accordance with claim 1, further comprising:
continuously adapting at least one of the one or more biases, the one or more filter coefficients, and the one or more prediction error variances.

7. A method in accordance with claim 1, wherein the one or more filter coefficients are further defined as data-dependent noise prediction (DDNP) filter coefficients.

8. A method in accordance with claim 1, wherein at least one of adapting the one or more filter coefficients and adapting the one or more prediction error variances is performed using biases that have not been adapted.

9. A method in accordance with claim 1, wherein at least one of adapting one or more biases, adapting one or more filter coefficients, and adapting a prediction error variance is performed using unknown data.

10. A method in accordance with claim 1, further comprising:
using channel reliability information from a channel detector to qualify one or more samples for use by an adaptation engine in adaptation using predicted data from the channel detector.

11. A method in accordance with claim 1, further comprising:
updating at least one of current biases, current filter coefficients, and current prediction error variances with at least one of the updated one or more biases, the updated one or more filter coefficients, and the updated one or more prediction error variances at a sector or fragment boundary or when a channel detector is not busy.

12. A method in accordance with claim 1, wherein at least one of adapting the one or more biases, adapting the one or more filter coefficients using the adapted one or more biases, and adapting the one or more prediction error variances using the adapted one or more biases and the adapted one or more filter coefficients occurs without partial response target information.

13. A method in accordance with claim 1, further comprising:
degenerating one or more higher state biases using one or more lower state biases.

14. A method in accordance with claim 1, further comprising:
reducing at least one of a number of filter coefficients and a number of prediction error variances using polarity symmetry.

15. A method in accordance with claim 1, further comprising:
reducing at least one of a number of filter coefficients and a number of prediction error variances using polarity symmetry and degeneration of at least one of filter coefficients and prediction error variances.

16. A method in accordance with claim 1, wherein adapting the one or more filter coefficients further comprises:
utilizing a first adaptation rate during a first period of initial adaptation;
utilizing a second adaptation rate during a second period of initial adaptation, wherein the second adaptation rate is slower or smaller than the first adaptation rate; and
utilizing a third adaptation rate during a continuous adaptation, wherein the third adaptation rate is slower or smaller than the second adaptation rate.

17. A method in accordance with claim 1, wherein the first adaptation rate is utilized until a pre-determined number of hits is collected.

18. A method in accordance with claim 1, further comprising:
adapting noise prediction parameters for a second condition before an adaptation of noise prediction parameters for a first condition is completed.

19. A system, comprising:
a bias adaptation component configured to adapt one or more initial biases by averaging a plurality of samples using an optimum gain profile, wherein the optimum gain profile provides a running average of the adapted one or more biases;
a filter coefficients component configured to, after the one or more initial biases are adapted, adapt one or more filter coefficients using the adapted one or more biases; and
a prediction error variance component configured to, after the one or more filter coefficients are adapted, adapt one or more prediction error variances using the adapted one or more biases and the adapted one or more filter coefficients.

20. A system, comprising:
a detector; and
a computation component configured to receive noise prediction parameters, the noise prediction parameters comprising:
one or more adapted biases adapted by averaging a plurality of samples using an optimum gain profile, wherein the optimum gain profile provides a running average of the adapted one or more biases,
one or more filter coefficients adapted using the adapted one or more biases, and
one or more prediction error variances adapted using the adapted one or more biases and the adapted one or more filter coefficients,
wherein the computation component is further configured to convert the noise prediction parameters into a form that is directly usable by the detector.

* * * * *